C. J. SEVERSON.
DEMOUNTABLE RIM.
APPLICATION FILED JUNE 19, 1913.

1,113,497.

Patented Oct. 13, 1914.
2 SHEETS—SHEET 1.

Witnesses:
E. C. Skinkle
Emily M. King

Inventor
Carl J. Severson
By his Attorneys
Williamson & Merchant

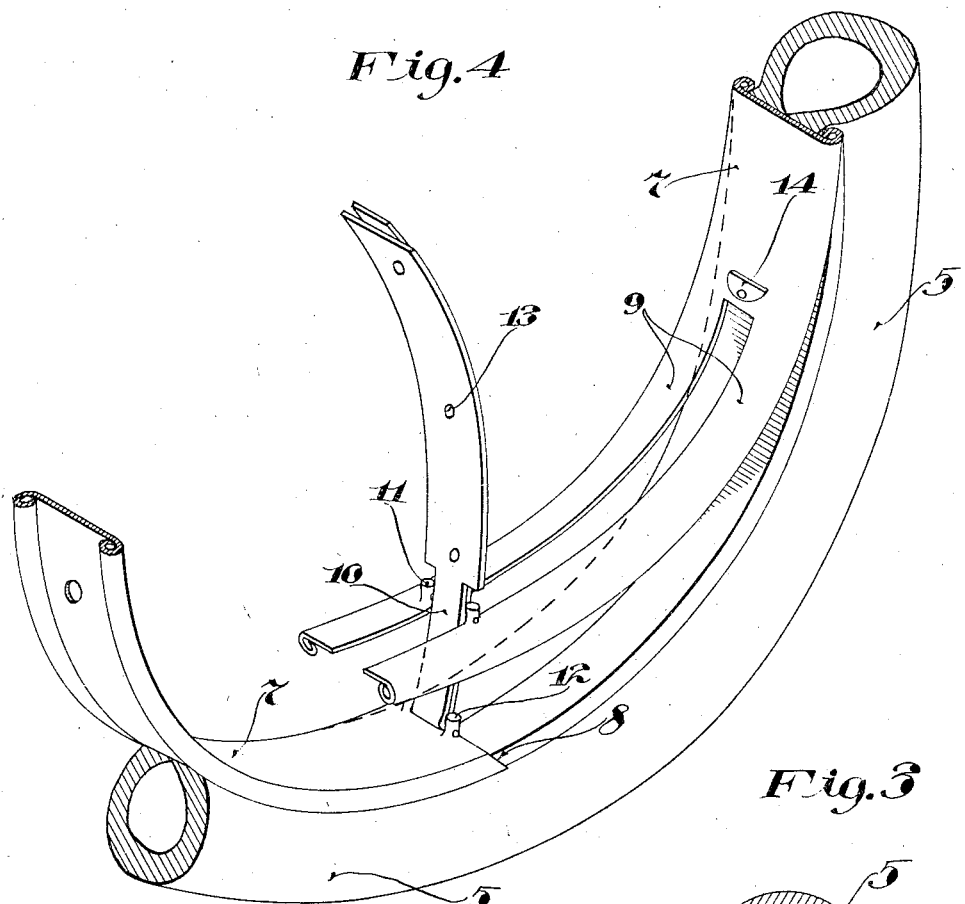
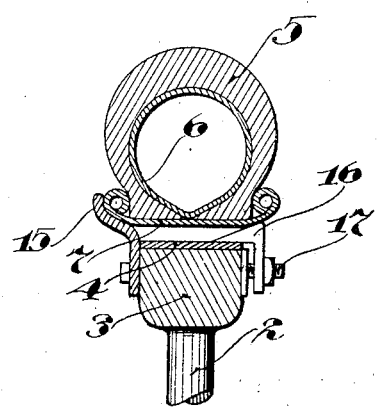
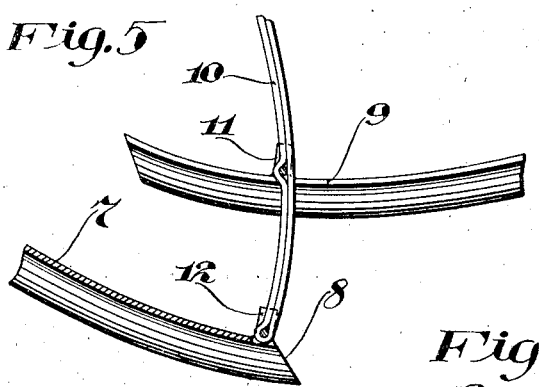
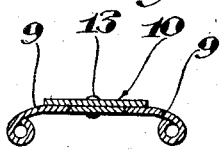

UNITED STATES PATENT OFFICE.

CARL J. SEVERSON, OF MINNEAPOLIS, MINNESOTA.

DEMOUNTABLE RIM.

1,113,497.  Specification of Letters Patent.  Patented Oct. 13, 1914.

Application filed June 19, 1913. Serial No. 774,598.

*To all whom it may concern:*

Be it known that I, CARL J. SEVERSON, a citizen of the United States, residing at Minneapolis, in the county of Hennepin and State of Minnesota, have invented certain new and useful Improvements in Demountable Rims; and I do hereby declare the following to be a full, clear, and exact description of the invention, such as will enable others skilled in the art to which it appertains to make and use the same.

My invention has for its object to provide an extremely simple and highly efficient wheel rim which is demountable from the wheel and detachable from the tire.

To the above ends, the invention consists of the novel devices and combinations of devices hereinafter described and defined in the claims.

In the accompanying drawings, which illustrate the invention, like characters indicate like parts throughout the several views.

Figure 1:
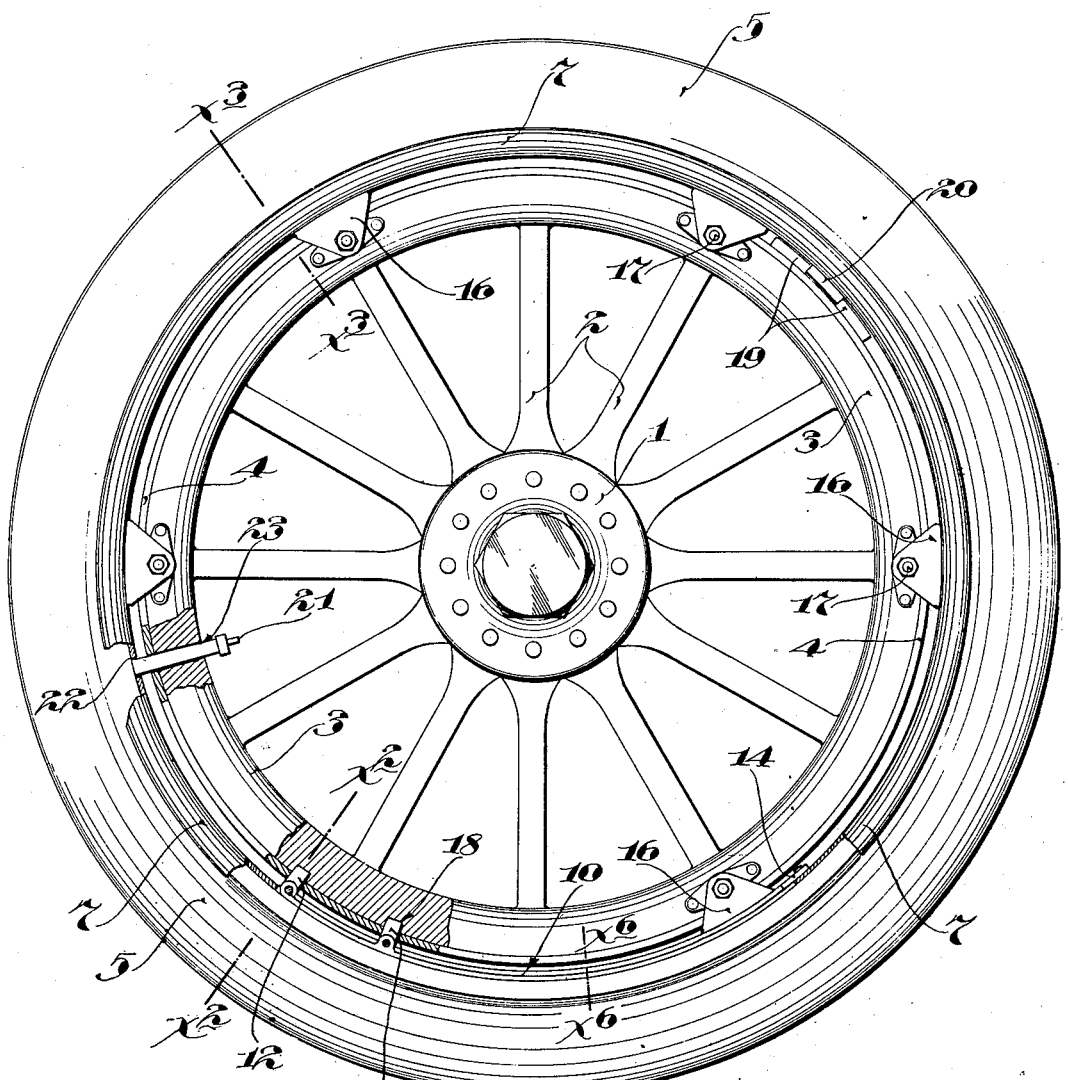
Figure 2:
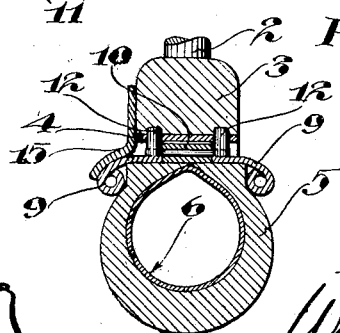

Referring to the drawings: Figure 1 is a view in side elevation, showing the improved rim applied to a wheel and pneumatic tire of the automobile type, some parts being broken away, and some of the exposed parts being shown in section; Fig. 2 is a transverse section, taken on the line $x^2$ $x^2$ of Fig. 1; Fig. 3 is a transverse section, taken on the line $x^3$ $x^3$ of Fig. 1; Fig. 4 is a perspective view of the demountable rim and pneumatic tire, some parts being broken away; Fig. 5 is a detail view partly in section and partly in edge elevation, showing the ends of the demountable rim and toggle acting connection therebetween; and Fig. 6 is a transverse section taken through the demountable rim on the line $x^6$ $x^6$ of Fig. 1.

Referring to the wheel proper, the numerals 1, 2 and 3 indicate, respectively, the hub, spokes and wooden felly thereof, and the numeral 4 indicates a metal hoop which surrounds and is preferably shrunk onto said felly.

The numeral 5 indicates the circumferentially split outer casing and the numeral 6 the inner tube of a pneumatic tire of standard construction.

In accordance with my invention, the demountable rim 7, which, as shown, is of the straight wall type, is channel-shape in cross-section and the sides thereof are formed by rolling the longitudinal edges of the rim. It is, of course, understood that the rim 7 may be of the clencher type if desired. Said rim is transversely divided and the ends thereof are reversely beveled, as best shown in Fig. 5, to afford an oblique joint 8. One end of the rim 7 is bifurcated and the prongs 9 thereof are secured to the other end of said rim by a toggle acting connection in the form of a lever 10.

On each end portion of the rim 7 is secured a pair of inwardly projecting, transversely spaced lugs 11 and 12. The lugs 11 are located one on each of the prongs 9 and are circumferentially spaced inward from the ends thereof, and the lugs 12 are located close to the joint 8. One end of the lever 10 is pivotally secured to and between the lugs 12, and the intermediate portion thereof is pivotally secured to and between the lugs 11. This lever 10 is, as shown, preferably constructed from a piece of flat metal, bent upon itself, and the sections thereof are secured together by rivets 13. The lever 10 is bent on the arc of a circle having the same diameter as that of the wheel rim and the lower section thereof is large enough to completely fill the space between the prongs 9. The upper section of the lever 10, outward of the lugs 11, is materially wider than the underlying lower section thereof, to afford reversely extended flanges adapted to overlap and rest upon the adjacent edge portions of the prongs 9 when the lever 10 is closed. A turn button 14 is pivotally secured to the rim 7, adjacent to the inner ends of the prongs 9, and is engageable with the free end of the inner section of the lever 10, for holding the same seated between the said prongs 9.

So far as my invention is concerned, any suitable means may be provided for demountably holding the improved rim on the wheel proper but, in the drawings, I have shown the same secured to the permanent rim of the wheel, by means of an annular retaining flange 15 and a plurality of circumferentially spaced cam acting lock lugs 16, located, respectively, on the inner and outer faces of the wheel felly 3. Common draw bolts 17 are passed through the flange 15, felly 3 and lock lugs 16, for securing the flange 15 and lock lugs 16 to the felly 3 and for drawing said lock lugs toward the flange 15, to force the demountable rim 7 against the flange 15, under a varying pressure. This rim securing means is of well known construction and forms no part of my present invention.

The lugs 11 and 12, to which the lever 10 is pivotally secured, are seated in perforations 18 formed in the metal hoop 4 and the felly 3, to prevent creeping of the rim 7 with respect to the wheel proper. Coöperating with the lugs 11 and 12 and located substantially diametrically opposite the same is a pair of circumferentially spaced lugs 19 and a single lug 20 interlocking therewith. The lugs 19 are rigidly secured to the periphery of the hoop 4 and the lug 20 is rigidly secured to the rim 7. In applying the demountable rim 7 to the wheel proper, the lugs 11 and 12 are first placed in the perforations 18 and the diametrically opposite side of the said rim is then moved laterally, to carry the lug 20 into interlocking engagement with the lugs 19.

The inner tube 6 is provided with the customary air valve 21 which projects through alined radial perforations 22 and 23 formed, respectively, in the rim 7 and in the felly 3 and hoop 4. By reference to Fig. 1, it will be noted that the perforation 22, for receiving the air valve 21, is quite close to the end of the rim 7 to which the lugs 12 are secured. The location of this perforation 22 is highly important, as will presently appear.

After the improved rim has been removed from the wheel proper, the tire may be very quickly and easily taken off by moving the lever 10 into a position as shown in Figs. 4 and 5. During this movement of the lever 10, the bifurcated end of the wheel rim 7 is simultaneously moved radially inward and circumferentially of the other end of said rim and peels the rim from the tire. The circumferential movement of the bifurcated end of the wheel rim 7 contracts said rim sufficiently to permit the same to be removed from the tire without the use of any tools whatsoever. The oblique joint 8 prevents the ends of the wheel rim from binding during the separation of the ends of the rim 7. During the process of removing the bifurcated end of the rim from the tire, the other end of said rim remains stationary, thus avoiding all danger of mutilating or tearing off the air valve 21.

With the use of the improved demountable wheel rim, repairs may be easily and quickly made and pneumatic tires may be readily removed without the use of tools. Furthermore, it is extremely simple and of comparatively small cost to manufacture.

What I claim is:

1. A transversely divided demountable wheel rim having one end bifurcated, and a lever intermediately pivoted to the bifurcated end of said wheel rim, inward of the ends of the prongs thereof, and pivotally secured, at one end, to the other end of said wheel rim, said lever arranged to be seated between said prongs.

2. A transversely divided demountable wheel rim having one end bifurcated, a lever intermediately pivoted to the bifurcated end of said wheel rim, inward of the ends of the prongs thereof, and pivotally secured, at one end, to the other end of said wheel rim, said lever arranged to be seated between said prongs, and means for locking said lever between said prongs.

3. A transversely divided demountable wheel rim having one end bifurcated, a lever intermediately pivoted to the bifurcated end of said wheel rim, inward of the ends of the prongs thereof, and pivotally secured, at one end, to the other end of said wheel rim, said lever arranged to be seated between said prongs and provided with side flanges overlapping the adjacent edges of said prongs, and means for locking said lever between said prongs.

In testimony whereof I affix my signature in presence of two witnesses.

CARL J. SEVERSON.

Witnesses:
EMILY M. KING,
HARRY D. KILGORE.